United States Patent [19]

Orth et al.

[11] Patent Number: 4,500,234
[45] Date of Patent: Feb. 19, 1985

[54] TREPANNING TOOL

[75] Inventors: Eugene C. Orth, Delafield; Sebastian Ebenhoch, Menomonee Falls, both of Wis.

[73] Assignee: Waukesha Cutting Tools, Inc., Waukesha, Wis.

[21] Appl. No.: 441,287

[22] Filed: Nov. 12, 1982

[51] Int. Cl.³ .............................................. B23B 51/04
[52] U.S. Cl. .................... 408/206; 408/703; 408/713; 408/204
[58] Field of Search ............... 408/204, 226, 713, 202, 408/203, 205, 206, 207

[56] References Cited

U.S. PATENT DOCUMENTS

| 3,548,687 | 12/1970 | Holloway | 408/206 |
| 3,564,946 | 2/1971 | Käser | 408/204 |
| 3,591,306 | 7/1971 | Käser | 408/204 |
| 3,592,554 | 7/1971 | Takahara | 408/204 |
| 4,129,401 | 12/1978 | Berthier | 408/703 X |

FOREIGN PATENT DOCUMENTS

| 142673 | 7/1980 | Fed. Rep. of Germany | 408/206 |
| 1274017 | 10/1961 | France | 408/713 |
| 54-72595 | 6/1979 | Japan | 408/703 |
| 889296 | 12/1981 | U.S.S.R. | 408/204 |

OTHER PUBLICATIONS

Benz Kernbohr–Werkzeuge (German Publication).

Primary Examiner—William R. Briggs
Assistant Examiner—Glenn L. Webb
Attorney, Agent, or Firm—Andrus, Sceales, Starke & Sawall

[57] ABSTRACT

A trepanning cutting tool for producing a through hole in a metal workpiece by cutting an annular groove about a removable core utilizes four (4) carbide cutting inserts. The cutting inserts are so arranged that they sever the radial span of the annular groove into six (6) relatively small segments which can be readily evacuated from the cutting region in the form of chips.

6 Claims, 7 Drawing Figures

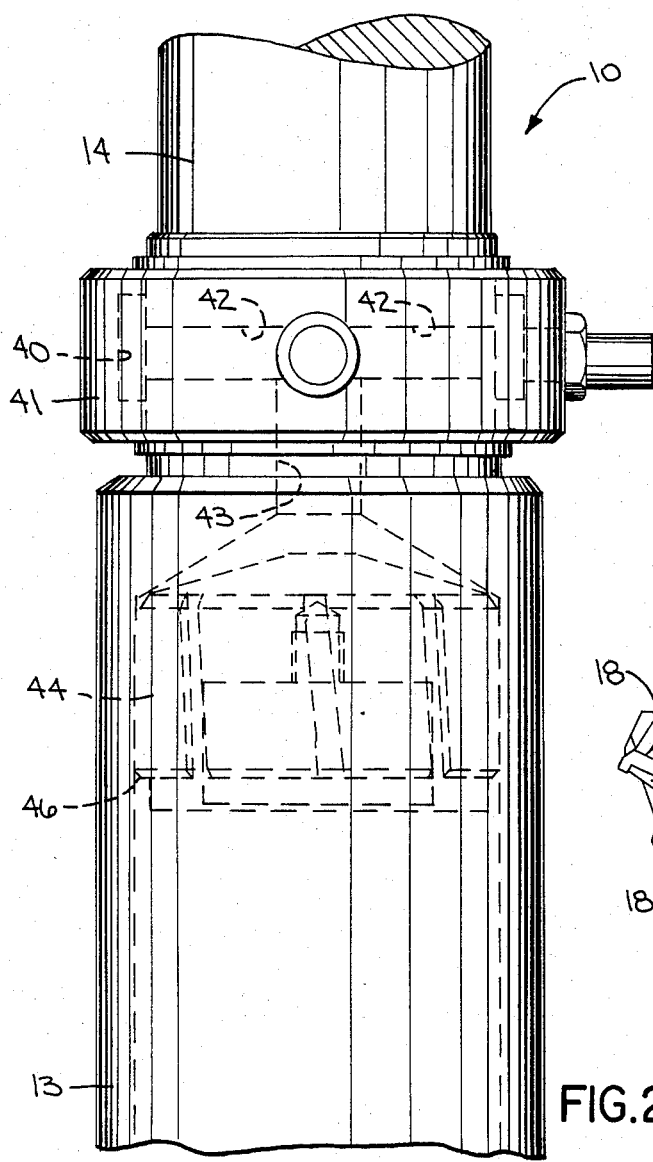
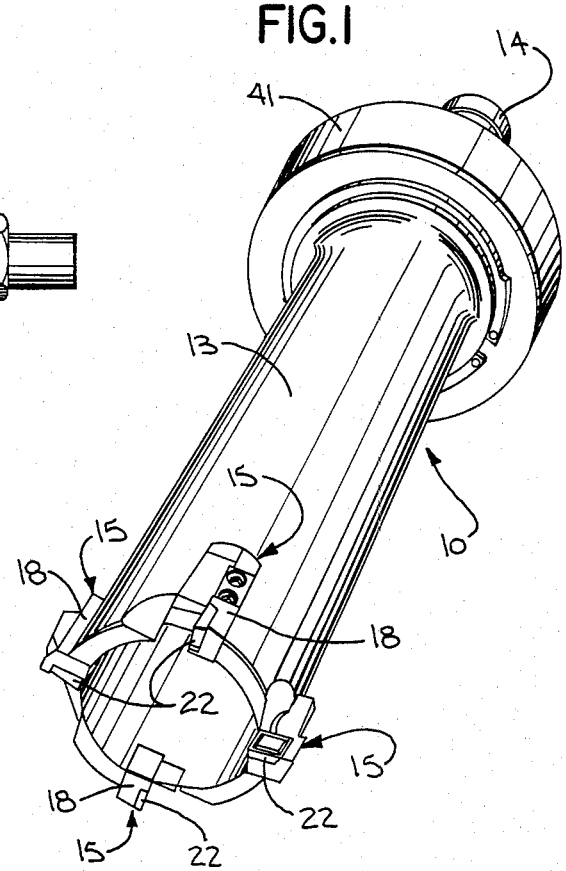
FIG.1
FIG.2
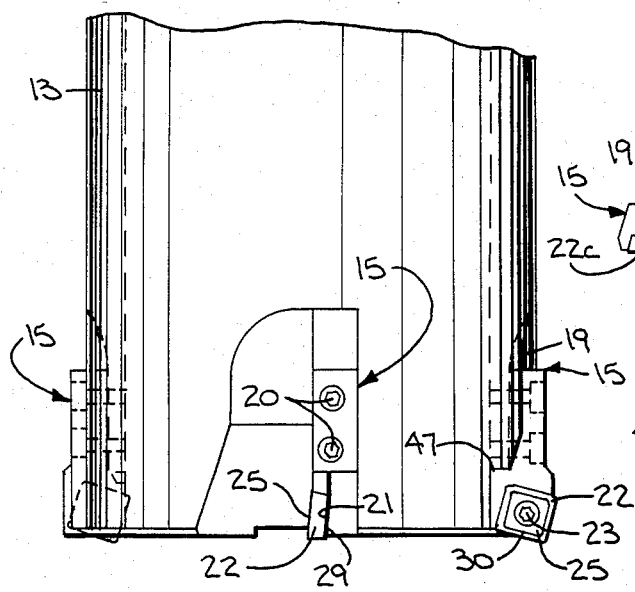
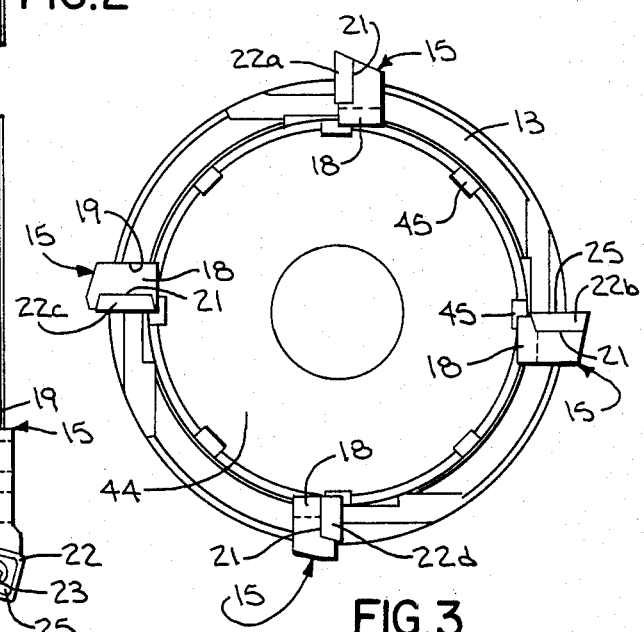
FIG.3

4,500,234

TREPANNING TOOL

BACKGROUND OF THE INVENTION

This invention relates to a trepanning tool for cutting holes in metal workpieces, and more particularly to such a tool utilizing cutting inserts.

A trepanning tool produces through holes by cutting an annular groove about a removable core. Such a cutting operation is particularly advantageous for cutting large diameter holes since it eliminates up to 75% of chip volume over conventional drilling methods and results in a core which will be subsequently usable. As compared to drilling methods for a hole of given diameter, a trepanning tool is substantially faster to save on labor and requires substantially less horsepower and thrust. A trepanning cutting tool can be used on most existing turning and boring machines. It is generally an object of this invention to provide a trepanning tool that utilizes carbide cutting inserts and which locates and orients the inserts in a manner to eliminate the need for a starter hole, evidence good self-centering effect, and minimize the horsepower and thrust requirements.

SUMMARY OF THE INVENTION

The trepanning cutting tool of this invention generally comprises a hollow, cylindrical body open at its leading end and closed at its trailing end. An axially disposed and extending shank is provided on the trailing end of the body for mounting the tool in a machine for actual or effective rotation relative to a metal workpiece. Four carbide cutting inserts having a cutting face defining a plurality of cutting edges at the periphery thereof are mounted at the leading end of the body. The inserts are circumferentially and equidistantly spaced with their cutting faces facing in the direction of tool rotation. The inserts are spaced at somewhat varying distances relative to the axis of the tool to present an innermost insert and a next innermost insert. The outermost insert is disposed to establish the outside diameter of an annular groove which is cut by the tool about a removable core and has an active cutting edge that extends generally inwardly toward the tool axis. The innermost insert is disposed to establish the inside diameter of the annular groove and has an active cutting edge which extends generally outwardly relative to the tool axis. The next outermost insert is angularly oriented relative to the outermost insert to provide that its active cutting edge will cut a segment of the annular groove that intersects with the active cutting edge of the outermost insert so that the active cutting edge of the outermost insert will cut a pair of spaced segments of the annular groove. The next innermost insert is angularly oriented relative to the innermost insert to provide that its active cutting edge will cut a segment of the annular groove that intersects with the active cutting edge of the innermost insert so that the active cutting edge of the innermost insert will also cut a pair of spaced segments of the annular groove. The four (4) cutting inserts are thus adapted to sever the radial span of the annular groove into six (6) relatively small segments which can be readily evacuated from the cutting region in the form of chips.

DESCRIPTION OF THE DRAWING FIGURES

The drawings furnished herewith illustrate the best mode presently contemplated and are described hereinafter.

In the drawings:

FIG. 1 is a perspective view of the trepanning tool of this invention;

FIG. 2 is an enlarged side elevation of the trepanning tool and with dotted lines shows the internally disposed coolant distribution means;

FIG. 3 is an end elevation of the trepanning tool;

DESCRIPTION OF THE ILLUSTRATED EMBODIMENT

Figure 4:
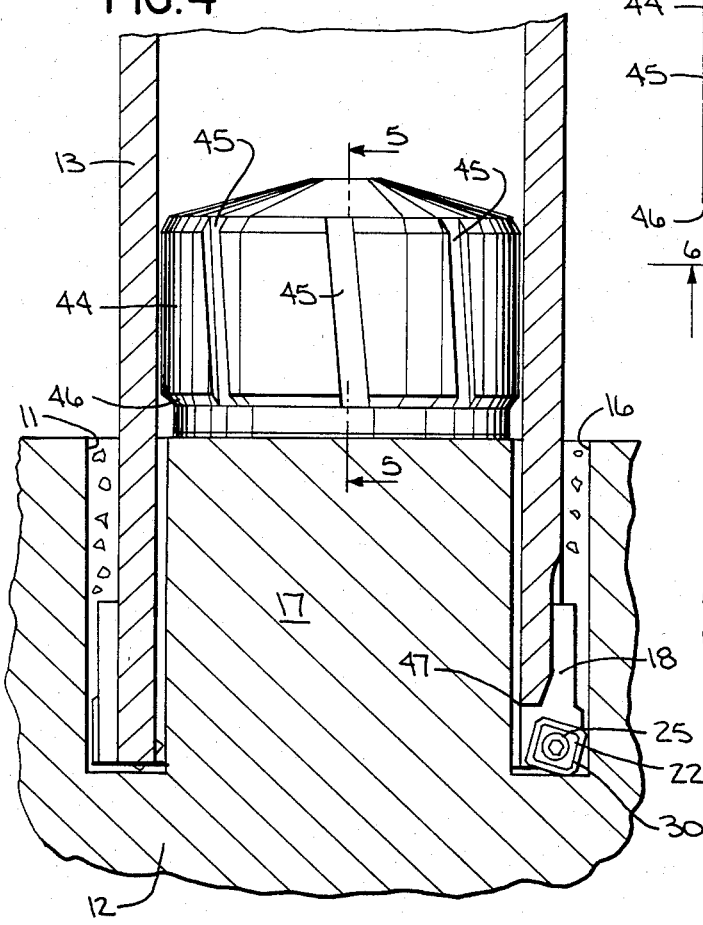
FIG. 4 is a partial sectional view showing the trepanning tool cutting a hole through a workpiece.

With reference to the drawings, the trepanning tool 10 for cutting a through hole 11 in a workpiece 12 generally comprises a hollow, cylindrical body 13 which is open at the leading end thereof. The opposite end of the body 13 is closed and provided with an axially extending shank 14 for engaging within an appropriate machine, not shown. At the leading end of the body 13, the tool 10 is provided with a plurality of spaced cutting means 15. In operation, a hole 11 is produced in the workpiece 12 by relative rotational movement between the cutting tool 10 and the workpiece, and by cutting an annular groove 16 about a removable core 17 as generally shown in FIG. 4. Either the tool 10 or the workpiece 12 may be rotated in the machine, not shown, to produce the hole 11.

As best shown in FIGS. 1 and 3, the leading end of the tool 10 is provided with four (4) circumferentially and equidistantly spaced cutting means 15. Each of the cutting means 15 includes a cartridge 18 seated in a suitable recess 19 at the leading end of the body 13. Each cartridge 18 is secured within its body recess 19 by a pair of screws 20. Each of the cartridges 18 is provided with a suitable pocket 21 that opens in the leading direction of the tool 10 both axially and rotationally to receive and seat an indexable carbide cutting insert 22. The cutting inserts 22 are apertured centrally to provide for their securement by a threaded member 23 which extends into the corresponding cartridge 18.

As viewed in plan the carbide cutting inserts 22 are generally rhombic-shaped to provide four (4) main cutting edges 24 at the periphery of the cutting face 25. The two (2) sets of diametrically opposed corners 26 and 27 of the rhombic-shaped insert 22 are 94° and 86°, respectively, and the opposed corners 27 having the lesser sized angle are beveled to present auxiliary cutting edges 28. The opposed corners 26 are also beveled but need not serve as cutting edges. From their cutting face 25, the inserts 22 are undercut to a generaly parallel face 29 which seats against the back wall of the corresponding cartridge pockets 21.

The back wall of the cartridge pockets 21 and therefore also the cutting face 25 of the several inserts 22 are inclined relative to the axis of the tool 10 in a manner to present the active main cutting edges 24 in a leading position both axially and rotationally to provide for cutting of the metal in the annular groove 16 by a shearing action. The cutting face 25 of the several inserts 22 have a chip breaking projection 30 to provide for the breaking of the severed metal into relatively small chips for easy removal from the groove 16.

Figure 7:
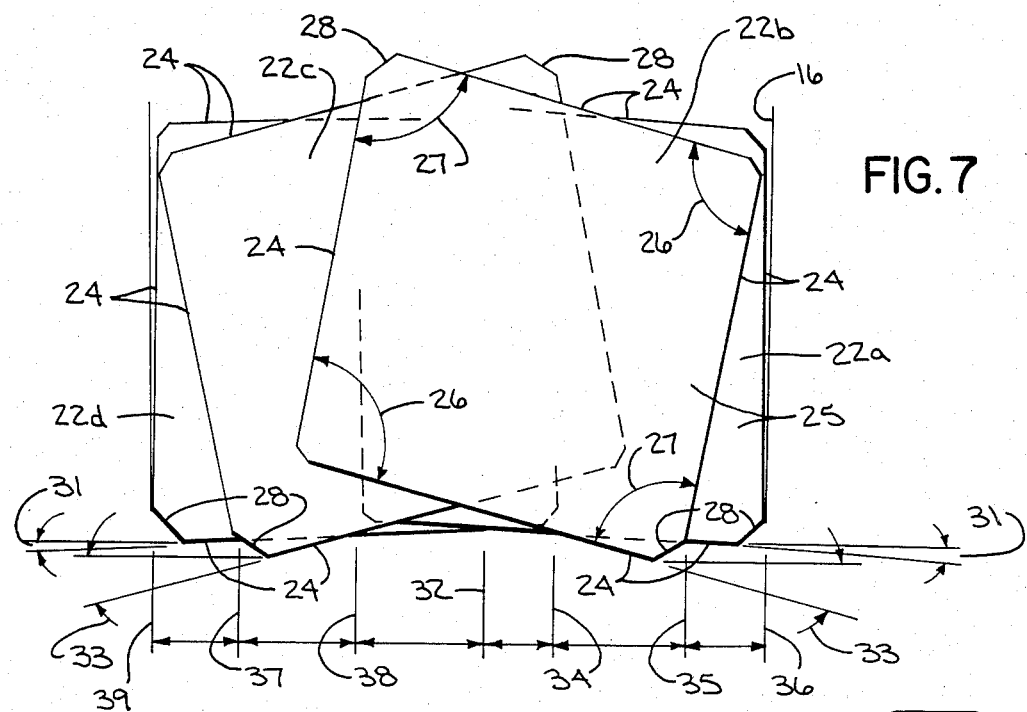
FIG. 7 is a schematic view with the several cutter inserts in superposed relation generally showing the cutting path of each insert within the annular cutting groove and the segmental portions of the groove being cut by each insert.
Figure 5:
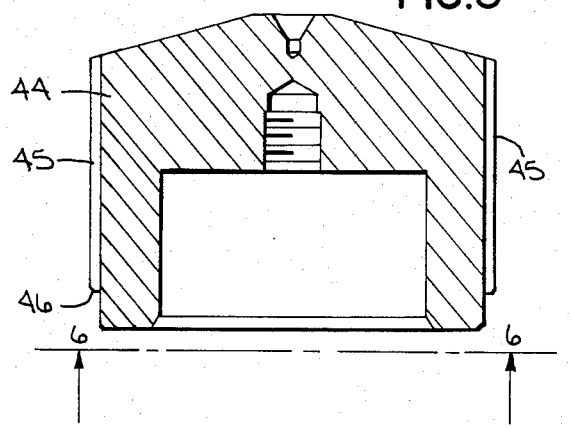
FIG. 5 is a sectional view of the coolant distribution plug taken generally on the line 5—5 of FIG. 4.

FIG. 7 shows the several cutting inserts 22a, 22b, 22c and 22d superimposed upon each other to generally indicate their relative positions within the annular groove 16 and their orientation in the plane of their respective cutting faces 25. As generally indicated, the leading main cutting edge 24 as well as the adjacent auxiliary cutting edge 28 of each insert 22a, 22b, 22c and 22d are active to shear cut the groove 16. As shown, the outside diameter of the groove 16 is established by the auxiliary cutting edge 28 of the outermost insert 22a and the inside diameter of the groove is established by the auxiliary cutting edge 28 of the innermost insert 22d.

With continuing reference to FIG. 7, the junctures of the active main cutting edges 24 with the adjacent auxiliary cutting edges 28 of the outermost and innermost inserts 22a and 22d are disposed in a common plane generally normal to the tool axis. The outer inactive main cutting edge 24 of the outermost insert 22a is generally provided with a 1° back taper from the outer wall of the groove 16 and in the direction of the trailing end of the tool 10 to provide a clearance for that cutting edge. Similarly, the inner inactive main cutting edge 24 of the innermost insert 22d is generally provided with a 1° back taper from the inner wall of the groove 16 and in the direction of the trailing end of the tool 10 to provide clearance for that cutting edge. With the outermost insert 22a and the innermost insert 22d so disposed, their respective active main cutting edges 24 will incline from their leading junctures with their corresponding auxiliary cutting edges 28 at an angle of 3° toward the trailing end of the tool 10 as shown at 31, and their respective main cutting edges 24 will intersect generally at the line 32

The axially leading junctures of the active main cutting edges 24 with the adjacent auxiliary cutting edges 28 of the next outermost and next innermost inserts 22b and 22c are also disposed in a common plane generally normal to the axis of the tool 10. When the active main cutting edges 24 of the inserts 22b and 22c are inclined at an angle of 15° as shown at 33 from their respective leading junctures toward the trailing end of the tool 10, those edges will intersect generally at the midpoint of the groove 16 while the outer inactive main cutting edge 24 of the insert 22b and the inner inactive main cutting edge 24 of the insert 22c remain within the clearance bounds of the back tapers imposed upon the outer main cutting edge 24 of the outermost insert 22a and the inner main cutting edge of the innermost insert 22d, respectively. So disposed, the next outermost insert 22b will cut a segment of the groove 16 generally extending between the lines 34 and 35. Since the segment of the groove 16 cut by the insert 22b intercepts the active main cutting edge 24 of the outermost insert 22a, the latter is disposed to cut two (2) spaced segments of the groove 16; namely, the segment extending between the lines 32 and 34 and the additional segment extending between the lines 35 and 36. Similarly, the next innermost insert 22c will cut a segment of the groove 16 generally between the lines 37 and 38 which intercepts the active main cutting edge 24 of the innermost insert 22d. As a consequence the innermost insert 22d will also cut a pair of spaced groove segments; namely, the segment extending between the lines 39 and 37 and the additional segment between the lines 38 and 32. Thus the four (4) circumferentially and equidistantly spaced inserts 22a, 22b, 22c and 22d as generally shown in FIG. 3, are disposed to cut six (6) relatively narrow segments of the annular groove 16 resulting in relatively small chips easily removed by a coolant wash. It should be understood that the pockets 21 of the respective cartridges 18 must be appropriately cut to properly locate and orient the corresponding inserts 22a, 22b, 22c and 22d to perform in the manner indicated in FIG. 7.

When the active main cutting edges 24 of the inserts 22 become dull, the inserts may be rotated 180° and reseated in the same pocket 21 to provide a fresh active main cutting edge. After both opposed main cutting edges 24 have been dulled, the rhombic-shaped character of the inserts 24 requires that the outermost inserts 22a and 22b be interchanged with the innermost inserts 22c and 22d so that the other opposed main cutting edges 24 may also be utilized.

Since the trepanning cutter tool 10 begins a cut with only a minimal point contact by only two (2) inserts 22 (inserts 22b and 22c in FIGS. 3 and 7), the forces acting on the tool are initially generally small and reasonably well balanced to eliminate the need for a starter hole or bushing. As the cut continues and the forces on the tool 10 increase, they will remain reasonably well balanced as suggested by the symmetry of the inserts 22 relative to the groove 16. It may be observed, too, that while the innermost inserts 22c and 22d operate on a somewhat shorter radius from the axis of the tool 10 than do the outermost inserts 22a and 22b, the innermost inserts do cut a somewhat larger combined segment of the groove 16 between lines 39 and 32 than do the outermost inserts which cut a combined segment of the groove between lines 32 and 36 to further contribute to a good balance of forces acting on the tool 10. In view of the good balance of forces acting on the tool 10, power and thrust requirements are minimized and the tool will evidence a good self-centering effect and remain true in its course through the workpiece 12.

The trepanning tool 10 further includes coolant supply means whereby coolant under pressure is directed to the leading end of the tool to cool the cutting edges and evacuate the chips.

The coolant under pressure from a source, not shown, flows into the annular chamber 40 of the coolant inducer ring 41 mounted on the shank 14 of the tool 10 generally adjacent to the body 13. The coolant is directed from the chamber 40 into the interior of body 13 through one or more radial passages 42 provided in the shank 13 and which communicate with a single axial passage 43 centrally of the shank and which opens to the interior of the body.

Figure 6:
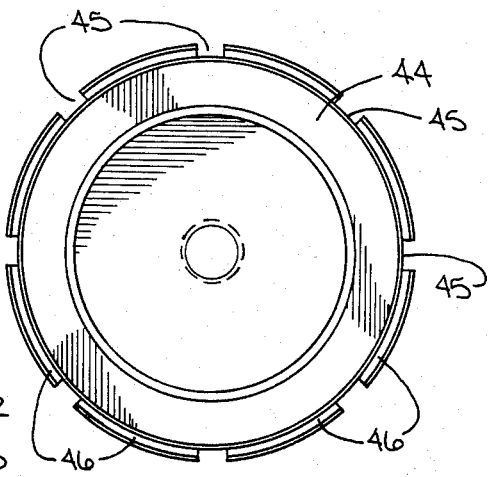
FIG. 6 is an end view of the coolant distribution plug as viewed along the line 6—6 of FIG. 5.

Interiorly of the body 13, the coolant under pressure is generally contained and distributed by the plug 44 which is slidably disposed within the body. The coolant under pressure contained above the plug 44 is distributed toward the underside of the plug in controlled amounts and at increased velocity through a plurality of axially and angularly extending, relatively small grooves 45 that are circumferentially and equidistantly spaced about the periphery of the plug. As shown in FIG. 6, the plug 44 is provided with eight (8) such grooves 45. The angularity of the grooves 45 is in a direction counter to the direction of actual or effective tool rotation to impart a form of swirl to the coolant flowing at a relatively high velocity to the leading end of the tool for maximum coolant penetration and chip evacuation.

In service and immediately prior to a cutting operation by the tool 10, the coolant flow is turned on to fill the body 13 above the plug 44. The consequent pressure exerted on the plug 44 will initially force the plug to its extreme position at the leading end of the tool 10 wherein the annular shoulder 46 on the plug will seat against one or more interfering shoulders 47 on the several insert cartridges 18 and coolant will issue forth from the grooves 45 as the cutting operation is commenced. As the cutting operation progresses and the tool 10 advances axially the plug 44 will engage and seat itself upon the core 17. After the plug 44 engages with and seats itself on the core 17, continuing axial advancement of the tool 10 will be relative to the seated plug with the trailing end of the body 13 correspondingly advancing toward the plug. Meanwhile the controlled amounts of the coolant under pressure constantly issues forth from the grooves 45 at increased velocity through the annular passage formed between the core 17 and the inside wall of the body 13 toward the leading end of the tool 10 to cool the cutting edges and wash the cutting chips from the cutting region and out of the annular groove 16 through the annular passage formed between the outer wall of the body 13 and the outside diameter of the annular groove. The plug 44, under coolant pressure, automatically ejects the core 17 from the workpiece 12 when cutting is complete.

Various modes of carrying out the invention are contemplated as being within the scope of the following claims particularly point out and distinctly claiming the subject matter which is regarded as the invention.

We claim:

1. In a trepanning tool for producing a through hole in a metal workpiece by cutting an annular groove about a removable core; a hollow, cylindrical body open at its leading end and closed at its trailing end; an axially disposed and extending shank provided at the trailing end of the body for mounting the tool in a machine for actual or effective rotation relative to the workpiece; four carbide cutting inserts having a cutting face defining a plurality of cutting edges at the periphery thereof and mounted at the leading end of the body; said inserts being circumferentially and equidistantly spaced with their cutting faces facing in the direction of actual or effective tool rotation; said inserts being varyingly spaced relative to the axis of the tool and comprising an outermost insert, a next outermost insert, an innermost insert, and a next innermost insert; said outermost insert being disposed to establish the outside diameter of the annular groove and having an active cutting edge extending generally inwardly toward the tool axis; said innermost insert being disposed to establish the inside diameter of the annular groove and having an active cutting edge extending generally outwardly relative to the tool axis; said next outermost insert being angularly oriented relative to the outermost insert to provide that its active cutting edge will cut a segment of the annular groove that intersects with the active cutting edge of the outermost insert so that the active cutting edge of the outermost insert will cut a pair of spaced segments of the annular groove; said next innermost insert being angularly oriented relative to the innermost insert to provide that its active cutting edge will cut a segment of the annular groove that intersects with the active cutting edge of the innermost insert so that the active cutting edge of the innermost insert will cut a pair of spaced segments of the annular groove; said four cutting inserts being thus adapted to sever the radial span of the annular groove into six relatively small segments that can readily be evacuated from the cutting region and annular groove as chips.

2. The structure as set forth in claim 1 wherein the cutting inserts are generally rhombic-shaped to include four main cutting edges, said inserts being initially indexable by rotation through 180 degrees in place to move the diametrically opposed inactive cutting edge to the active cutting edge position, said inserts being thereafter further indexable by interchanging the outermost and innermost inserts so that the other set of diametrically opposed inactive cutting edges can be alternately moved to the active cutting edge position.

3. The structure as set forth in claim 1 wherein the active cutting edges of the innermost insert and the outermost insert extend angularly from a first common plane generally normal to the tool axis in a direction toward the trailing end of the tool, and the active cutting edges of the next innermost insert and the next outermost insert extend angularly from a second common plane generally normal to the tool axis in a direction toward the trailing end of the tool, said second common plane being axially advanced relative to the first common plane to place the next innermost and next outermost inserts in an axially leading position, said next innermost and said next outermost inserts only making initial contact with the workpiece to start the cut for a hole so that the forces acting on the tool are initially generally small and reasonably well balanced to eliminate the need for a starter hole.

4. The structure as set forth in claim 3 wherein the angle formed between the active cutting edges of the innermost and outermost inserts relative to the first common plane is on the order of 3° and the angle formed between the active cutting edges of the next innermost and next outermost inserts relative to the second common plane is on the order of 15°.

5. The structure as set forth in claim 1 wherein the two outermost inserts cut on a longer radius from the axis of the tool than do the two innermost inserts, said two outermost inserts together cutting a lesser swath of the annular groove than do the two innermost inserts together, said combination of a longer radius and a lesser swath of the annular groove evidenced by the two outermost inserts together being generally balanced against a combination of a shorter radius and a wider swath of the annular groove evidenced by the two innermost inserts together to thereby provide for a self-centering effect for the tool.

6. The structure as set forth in claim 1 wherein a coolant under pressure is supplied to the interior of the hollow body and a plug is slidably disposed within the body to generally contain the coolant in said body, said plug having a plurality of axially and angularly extending slots spaced around the periphery thereof to distribute the coolant with increased velocity from the hollow body to the cutting region, the angularity of said slots being in the direction opposed to tool rotation to impart a form of swirl to the high velocity coolant to thereby provide maximum coolant penetration in the cutting region to cool the cutting edges and evacuate the chips from the annular groove.

* * * * *